United States Patent [19]

Staggers

[11] 4,071,355
[45] Jan. 31, 1978

[54] RECOVERY OF VANADIUM FROM PIG IRON
[75] Inventor: John O. Staggers, Downingtown, Pa.
[73] Assignee: Foote Mineral Company, Exton, Pa.
[21] Appl. No.: 685,971
[22] Filed: May 13, 1976
[51] Int. Cl.² .............................................. C21B 3/04
[52] U.S. Cl. .......................................... 75/30; 75/59; 75/60; 75/129; 75/135
[58] Field of Search ....................... 75/30, 129, 58, 59, 75/60, 134, 84, 51, 24, 135

[56] References Cited
U.S. PATENT DOCUMENTS

| | | | |
|---|---|---|---|
| 3,420,659 | 1/1969 | Rathmann et al. | 75/84 |
| 3,579,328 | 5/1971 | Aas et al. | 75/30 |
| 3,852,062 | 12/1974 | Knuppel et al. | 75/60 |
| 3,904,399 | 9/1975 | Murton | 75/51 |

Primary Examiner—Walter R. Satterfield
Attorney, Agent, or Firm—Howson and Howson

[57] ABSTRACT

An improved method is described for processing pig iron containing vanadium to obtain a slag containing at least 8 percent vanadium and having a vanadium to iron ratio of at least 0.5 which is directly useful as a refining agent for producing ferrovanadium alloys, the improvement residing in simultaneously introducing a highly oxidizing gas and a protective fluid below the upper surface of a bath of the molten pig iron maintained at a temperature in the range of 2600° to 2900° F. to oxidize vanadium preferentially, as compared to iron, and thereby produce a vanadium-containing slag in which the ratio of vanadium to iron is increased.

5 Claims, No Drawings

RECOVERY OF VANADIUM FROM PIG IRON

BACKGROUND OF THE INVENTION

The present invention relates to an improved method for processing pig iron containing vanadium to produce a valuable slag having a high ratio of vanadium to iron which is useful in the production of vanadium alloys.

Vanadium in the form of its low-melting ferrovanadium alloys, is widely used as an alloying agent to impart toughness and other desirable properties to iron and steel. Among the most useful vanadium alloying agents are the alloys produced according to the process of Rathmann and Rasmussen U.S. Pat. No. 3,420,659 issued Jan. 7, 1969. This process is carried out in two steps. In the first step a vanadium-containing material is smelted with silica, a flux, and a carbonaceous reducing agent to produce a primary vandium silicide having a silicon content of 25 to 60 percent. Inasmuch as such a silicon content is too high for an alloying agent for iron or steel, the primary silicide is refined in the second step of the process by melting it with lime and a vanadium-containing refining agent to increase the vanadium content of the alloying agent and reduce its silicon content to less than 20 percent. While the richest source of vanadium for the refining step is vanadium pentoxide, this material is very expensive due to the chemical processing required in its manufacture. For that reason it is preferred to look elsewhere for the necessary vanadium. A number of relatively inexpensive sources of vanadium exist such as spent catalysts, petroleum residues and vanadium-bearing slags from the refining of pig iron.

To be useful in the refining step of the Rathmann et al. process, a refining agent should contain at least about 8 percent of vanadium. Materials containing up to about 34 percent vanadium may be used with advantage. Materials having a higher content can be economically processed by aluminum reduction and so are not used in this process normally. Raw materials containing less than 8 percent or more than 34 percent vanadium may be blended to produce a refining agent having a suitable concentration. It should be noted here that while throughout this specification and appended claims vanadium content of the various materials, such as ore, slag, pig iron or other material, is expressed in terms of metallic vanadium, those skilled in the art will appreciate that the vanadium values may be present in various forms other than metallic vanadium, such as $V_2O_3$, $V_2O_4$, $V_2O_5$ or some other vanadium compound.

The preferred refining agents for use in the Rathmann et al. process are vanadium-containing slags derived from the refining of vanadium-containing pig iron. Such slags are available in huge quantities and generally contain more than the required 8 percent of vanadium. However, it is also necessary to the process that the slag have a vanadium to iron weight ratio of at least about 0.5, and preferably from about 0.75 to 1.0, to be useful directly as a refining agent without prior deironing. Available slags are generally deficient in this respect. For example, the South African Highveld slags contains 12 to 16 percent vanadium, but their vanadium to iron ratio is less than 0.5, typically only about 0.4.

In the Highveld process titaniferous magnetite ore from the Bushveld igneous complex of South Africa, containing about 1 percent vanadium, is fed into large prereduction kilns together with appropriate amounts of coal, dolomite and silica and heated to about 1830° F. In this way the oxygen content of the iron ore is reduced to about 70 percent of theoretical, the coal is charred, and the dolomite is calcined. The hot partially reduced burden of the kilns is conveyed in refractory lined hoppers to bins feeding the smelting furnaces. This material is then smelted in submerged arc electric furnaces operated at a power input level of 20 to 25 megawatts to produce hot metal which has the following typical analysis: 3.5 percent carbon, 1.28 percent vanadium, 0.25 percent silicon, 0.16 percent titanium, 0.065 percent sulfur and 0.075 percent phosphorous. The slag from the smelting operation generally analyzes: 20 percent $TiO_2$, 18 percent CaO, 17 percent MgO, 19 percent $SiO_2$ and 13 percent $Al_2O_3$.

The resulting hot metal is blown with oxygen in a shaking ladle at a temperature maintained below 2550° F. with the addition of scrap and ore as necessary. The resulting blown metal contains only traces of metalloids and about 3.1 percent carbon. The slag from the shaking ladle oxygen blowing operation contains the bulk of the vanadium, typically about 14 percent vanadium by weight but, as noted above, the vanadium to iron ratio of such Highveld slag is less than the level of 0.5 needed in the refining operation of the Rathmann et al. process, being typically about 0.4. For this reason, it is necessary to beneficiate or deiron such slags by melting them with lime and treating the melt with sufficient primary silicide from the process to reduce a substantial part of the iron oxide to metallic iron which is separated to increase the vanadium to iron ratio of the slag. This beneficiation process also oxidizes the vanadium, silicon, titanium, manganese and chromium values of the primary silicide and incorporates them in the deironed slag. In view of the foregoing it is apparent that there has been a long standing need in the art to provide an inexpensive vanadium-containing refining agent for use in the second step of the Rathmann et al. process containing from about 8 to 34 percent vanadium and having a vanadium to iron ratio of at least about 0.5, and that it would be especially desirable to provide for this purpose a slag from the refining of pig iron which would meet the necessary criteria without the need for further beneficiation.

It is, therefore, a primary object of the present invention to provide an improved process for the direct production, from vanadium-containing pig iron, of a slag which contains at least 8 percent vanadium and which has a vanadium to iron ratio of at least about 0.5.

SUMMARY OF THE INVENTION

The foregoing and other objects of the invention which will become apparent hereinafter are achieved by an improved process for the refining of pig iron containing at least about 0.5 percent vanadium to obtain a slag containing at least about 8 percent vanadium and having a vanadium to iron ratio of at least about 0.5; the improvement consisting of simultaneously introducing a highly oxidizing gas and a protective fluid below the upper surface of a bath of the molten metal maintained at a temperature of 2600° F. to 2900° F. Preferably, the process is continued until the carbon content of the metal is within the range of from about 2 to about 0.02 percent. It has been unexpectedly discovered that this results in an increased recovery of vanadium and a marked increase in the vanadium to iron ratio of the slag, thus producing directly a slag suitable for use in the refining step of the Rathmann et al. process without the need for benefication or deironing.

It is believed that the unexpected increase in the vanadium to iron ratio of such slags is due in part to the increase in vanadium recovery and to the fact that with introduction of the highly oxidizing gas below the surface of the molten pig iron at the stated temperature range, vanadium is oxidized preferentially as compared to iron, whereby less iron is oxidized and carried into the slag. Inasmuch as more of the iron remains in the molten pig iron, the vanadium to iron ratio of the slag is markedly increased to the desired level of at least about 0.5 and, indeed, generally to much higher levels, e.g. 0.75 to 1, which are highly desirable in the Rathmann et al. process.

The pig iron may be obtained from any source so long as it contains from at least about 0.5 percent up to about 3 percent vanadium. The preferred pig irons contain about 1 to 2 percent vanadium. Such pig iron is commercially available from several sources, for example, Highveld pig iron from South Africa normally contains somewhat more than one percent vanadium. Suitable vanadium-containing pig iron may also be produced by adding vanadium-containing materials to iron ore having an insufficient concentration of vanadium. For example, the titaniferous magnetite ore of the Tahawus deposit contains about 0.5 percent vanadium, but also contains so much titania (about 6 percent) that it cannot be converted to pig iron by conventional blast furnace processing. In fact, ores containing as little as 2 percent titania are unsuitable for blast furnace use. However, ores of such type may be blended with other vanadium-containing raw materials, such as petroleum residues or fly ash, and smelted in an electric furnace to produce pig iron containing from about 1 to 2 percent vanadium, for example, which would be useful in the process of the present invention.

The art of simultaneously introducing a highly oxidizing gas, e.g. oxygen and a protective fluid below the surface of molten pig iron is not new per se. An example of the basic process and a converter for the bottom blowing of ferrous metal to produce steel (Q-BOP) is described in Schempp U.S. Pat. No. 3,839,017 issued Oct. 1, 1974. Deterioration of the tuyeres and avoidance of this problem by providing uniform flow of the protecting hydrocarbon around the tuyeres is described in Knuppel et al. U.S. Pat. No. 3,852,062 issued Dec. 3, 1974. The novelty of the present invention resides in the discovery that the use of such techniques with molten pig iron maintained at a temperature of 2600° F. to 2900° F., the pig iron containing at least 0.5 percent of vanadium, results in the valuable slags of the present invention which could not be produced by the method previously used in refining such pig iron.

In summary, it has been found that by oxidative bottom blowing a pig iron containing at least 0.5 percent of vanadium, while the pig iron is maintained at a temperature of 2600° to 2900° F., a slag can be produced containing at least 8 percent vanadium and having a vanadium to iron ratio of at least about 0.5 and, indeed, normally about 0.75 to 1.0. Such slag is useful directly without further beneficiation in the refining step of the Rathmann et al. process to produce a 40% or higher grade of ferrovanadium useful as an alloying agent for iron or steel.

By the term "bottom blowing" is meant to include those several well known processes in which a highly oxidizing gas, such as oxygen, is introduced simultaneously with a cooling fluid, such as methane, beneath the surface of a bath of molten metal, namely pig iron. Those processes have been variously designated Q-BOP, LWS, SIP and AOD (see "Bottom-blown steel processes now number three; Q-BOP, LWS, and SIP" which appeared in the September 1972 issue of 33 Magazine, pp. 34–38.)

DETAILED DESCRIPTION OF THE INVENTION

As noted above, the vanadium-containing pig iron used in the process of the invention may be obtained from existing sources and processes such as the Highveld process of South Africa which provides pig iron typically containing about 1.28 percent vanadium. Other available pig iron useful in the invention may contain from about 0.5 up to about 3 percent vanadium. In an especially preferred embodiment of the invention the required pig iron is derived from otherwise uneconomic sources of vanadium. For example, the Tahawus deposit of titaniferous magnetite ore has not previously been exploited for its vanadium values despite the fact that the ore contains about 0.5 percent vanadium. The reason for this is that the ore also contains about 6 percent titanium dioxide which renders it unsuitable for conventional blast furnace processing to pig iron. Recovery of the vanadium values of this ore by conventional roast-leach methods is possible but uneconomic for the vanadium values alone, and the by-product magnetite, which is high in titania, is unattractive to steel producers.

Residues such as fly ash from the burning of Venezuelan fuel oil contain vanadium in varying amounts, up to 25 percent or more vanadium. Those containing 10 percent or more or even as low as 5 percent vanadium may be processed economically by conventional methods to recover vanadium values. However, it has not been economical to so process residues containing less than 5 percent vanadium because such residues contain appreciable amounts of carbon and nickel.

In view of the foregoing, large quantities of both by-products magnetite and petroleum fly ask containing significant amounts of vanadium exist and have previously had no economic utility. Despite the fact that neither of these materials alone represents an economically viable source of vanadium, it has been discovered that they may be blended to produce a synthetic vanadium-bearing magnetite ore containing about 0.75 to about 1.50 percent vanadium and about 2 to 6 percent titania ($TiO_2$) which can be smelted in a submerged arc electric furnace. In this way, pig iron containing about 1 to 2 percent vanadium, suitable for use in the present invention, is obtained from previously useless materials. Petroleum fly ashes suitable for use in this invention may contain from about 2 to about 10 percent, preferably 5 to 10 percent, vanadium.

A typical commercially available fly ash petroleum residue useful in the invention contains about 2.4 percent vanadium, about 7.8 percent sulfur trioxide, about 0.62 percent nickel oxide, about 47.8 percent carbon and about 40 percent water. This material is in the form of a very fine powder. Tahawus magnetite contains about 62–64 percent iron, about 0.4 to 0.6 percent vanadium, about 4 to 6 percent titania and various other constituents, and has a specific gravity of 4.9. Another one, Chibougamau, is available which contains about 0.8 percent vanadium, as compared to the 0.9 percent content of the South African magnetites. These ores are suitably ground to minus 65 mesh and blended with the foregoing fly ash in a weight ratio of ore to fly ash of about 1.5:1 to 3.5:1. The blend made in this way may be pelletized according to conventional procedures or fed directly to the electric furnace as blended. Other raw materials such as spent catalyst, petroleum residues other than fly ash and the like which contain significant vanadium values may also be blended with Tahawus magnetite or any other iron ore with or without its own content of vanadium to produce a synthetic mixture adapted to be smelted in the electric furnace to produce a vanadium-containing pig iron useful in the invention. The pig iron produced from the synthetic mixture comprising Tahawus magnetite and the fly ash will have a vanadium content of about 1 to about 2 percent, typically about 1.5 percent depending largely on the vanadium content of the fly ash and the proportion thereof in the blended synthetic ore; a carbon content of about 3.5 to about 4.5 percent, typically about 4 percent; and on the order of about 0.25 percent each of titanium, manganese and silicon.

Smelting The Ore

The smelting operation may be carried out in a submerged arc type electric furnace. The general procedures of submerged arc smelting are described in "Effective Energy Utilization From Direct Electric Ironmaking" by Thomas E. Ban, pp. 178–188 of *Energy Use and Conservation In The Metals Industry*, edited by Chang et al. from the proceedings of a symposium presented at the annual meeting of American Institute of Metallurgical Engineers in New York, New York, Feb. 16–20, 1975.

Submerged arc electric furnaces for ironmaking are generally larger than the well-known steel melting furnaces. Sized and proportioned charge, i.e. ore and coke, is allowed to continuously descend into the furnace crucible through coke loaded feed columns maintained by overhead hoppers. Electrothermal smelting is brought about by submerged arcs from the electrode to the high temperature carbonaceous charge on and within the molten ash. Dissipation of the electricity through resistance and myriads of miniature arcs in the carbon-bed burden beneath the electrodes supply the electrothermal energy for direct reduction by the carbon-iron oxide reactions. This also supplied the high temperature for production of slag and liquification and carbonization of the metal.

The Submerged Blowing Operation

The vanadium-bearing pig iron is first melted by induction heating according to conventional procedures, if necessary, or if the hot metal is available from the smelting operation, it may be charged directly to a conventional converter employed in the submerged blowing operation. The Q-BOP converter which is typical consists of a vessel arranged to be tilted between a vertical blowing position, a horizontal receiving position and a downwardly inclined pouring position. The converter is lined with a basic refractory such a magnetite or periclase (MgO) brick. The converter is further provided with a plurality of tuyeres in the bottom. Such tuyeres suitably consist of an inner tube for the delivery of a highly oxidizing gas, e.g. oxygen, and concentric outer tube. A protective or cooling fluid such as a hydrocarbon gas, petroleum oil, or inert gas such as argon or helium, is fed into the converter through the annular space between the inner and outer tubes of the tuyeres. Suitable piping and valving between the sources of oxidizing and protective fluids are provided to permit control of the timing and pressure of the flow of these fluids into the converter.

The general procedure is to charge the hot metal at a temperature of from about 2600° to about 2900° F., preferably about 2700° to 2800° F. into the converter disposed in its horizontal receiving position in which the tuyeres are disposed above the horizontal axis. On completion of the charging the converter is tilted upwardly to the vertical blow position and the valves are manipulated to initiate feeding of an oxidizing gas through the inner tube and a protective fluid through the outer tube of each tuyere. The pressure of the oxidizing gas is maintained at about 40 to about 90 psig., generally 50 psig. The pressure of the protective fluid generally will be about half that of the oxidizing gas, e.g. 20 to 45 psig. The range of operable pressures and optimum pressures will vary according to the size and design of the apparatus, fluids employed, and operating temperatures as known in the art of bottom blown steel production.

The blowing operation is normally quiet with little fume discharge from the open mouth of the converter, although the fluid streams and the reactions taking place do cause vigorous agitation of the melt. The blowing operation is continued until at least the theoretical amount of oxidizing fluid has been introduced based upon oxidation of substantially the entire vanadium content of the melt. The duration of the blowing period will of course depend upon the size of the converter, size of the charge and the rate of introduction of the oxidizing gas, but in general will vary from about 15 to about 30 minutes, about 20 minutes being typical.

The blowing period may, if desired, be carried out in two stages; the converter being tilted down to horizontal position and a sample of the partially blown metal is taken between stages. The converter is then returned to upright blowing position and the oxidizing and protective fluids are again fed for a second blowing period. At the end of the second blowing period the converter is tilted to pour position to discharge the refined melt in a suitable refractory lined vessel from which it is poured into molds and permitted to cool and harden into pig iron containing no more than about 0.4 percent vanadium, typically about 0.15 percent.

The slag which is separated from the hot metal, will contain at least about 8 percent vanadium and will have a vanadium to iron ratio of at least about 0.5, and typically about 0.75 to 1, or possibly higher.

A protective covering of pulverized lime is advantageously added to the hot metal to insulate it during transfer from the smelter or induction melting furnace to the converter. If desired, sufficient lime may be charged to the converter to convert vanadium values to calcium vanadate. While any highly oxidizing gas may be employed, the preferred gas is oxygen gas. Similarly, while a wide variety of protective fluids may be used to offset the heat of the exothermic blowing reactions and inhibit deterioration of the refractory lining and tuyeres, including liquid petroleum oils and fractions, ethane, propane and other hydrocarbon gases, inert gases such as argon and nitrogen, also hydrogen and steam, the preferred protective fluid is methane.

During the submerged blowing operation, important reactions occur whereby various impurities in the pig iron are converted to compounds to effect their removal from the pig iron. Thus, sulfur and phosphorous, like vanadium, are converted to oxides and enter into the slag. In addition, the carbon content of the iron is substantially reduced through oxidation. The degree of oxidation of carbon is important. The preferential oxidation of vanadium, as compared to iron, takes place initially during the blow, whereby the ratio of vanadium to iron in the slag increases to a value greater than about 0.5 when the carbon content of the metal falls below about 2 percent. This ratio increases substantially, generally to the range of 0.7 to 1.0, and even higher, as the carbon content of the metal is further reduced through oxidation. However, when the carbon content of the metal falls below about 0.02 percent, the ratio of vanadium to iron in the slag begins to decrease. Accordingly, the blow preferably is carried out so as to reduce the carbon content of the metal to a value in the range of about 2 to 0.02 percent.

The invention will now be described in greater detail in conjunction with the following specific examples illustrating preferred embodiments thereof.

EXAMPLE I

To illustrate a preferred embodiment of the invention in which the pig iron is derived from otherwise uneconomic sources of vanadium, a "synthetic ore" can be made by blending titaniferous magnetite ore from the Tahawus deposit and a fly ash derived from South American Petroleum. Such materials have the following typical analyses.

| Fly Ash From South American Petroleum | |
|---|---|
| Constituent | Percent |
| $V_2O_5$ | 4.3 (2.4V) |
| NiO | .62 |
| C | 47.80 |
| $SO_3$ | 7.80 |
| $H_2O$ | 40.00 |
| Tahawus Magnetite | |
| Constituent | Percent |
| Fe | 62–64 |
| $P_2O_5$ | 0.02–0.04 |
| $SiO_2$ | 1.0–2.0 |
| MnO | 0.06–0.10 |
| $Al_2O_3$ | 3.0–4.0 |
| CaO | 0.1–0.2 |
| MgO | 0.8–1.0 |
| S | 0.1–0.2 |
| $Cr_2O_3$ | 0.2–0.3 |
| $V_2O_5$ | 0.7–1.0 (.39–.56V) |
| $TiO_2$ | 4.0–6.0 |
| Specific Gravity | 4.9 |

The magnetite after being reground to minus 65 mesh (Tyler screen) is blended with the finely powdered fly ash in a suitable blender until a uniform mixture is achieved. This mixture may be smelted as such, but it is preferred to agglomerate it to facilitate handling and smelting. This may be achieved by the addition of about 5 percent of water binder to form a paste which can be extruded, dried and broken up to form pellets about 0.5 inch in diameter for example, or any other suitable size. The proportions of magnetite to ash may be varied as desired to provide a synthetic ore containing vanadium values equivalent to about 0.75 to about 1.5 percent vanadium. Such a synthetic ore can be smelted as described herein to provide a pig iron containing about 1 to about 2 percent vanadium which can in turn be refined according to the invention.

EXAMPLE II

In order to test the process of the present invention on a laboratory scale, a synthetic pig iron was made by melting together in an induction furnace a commercially available pig iron (Lot 867 Republic Steel) and a ferrovanadium alloy produced in the laboratory containing 40.3 percent vanadium and 5.85 percent silicon, the remainder being iron. The pig iron analyzed as follows:

| Element | Pig Iron Percent |
|---|---|
| C | 4.27 |
| Si | 0.72 |
| Mn | 0.095 |
| S | 0.035 |
| P | 0.027 |
| Al | 0.01 |
| Ti | 0.047 |
| Cu | 0.01 |
| V | 0.016 |
| Cr | 0.01 |
| Ni | 0.01 |
| Fe | 94.75 |
| | 100.000 |

These materials were melted together in a conventional electrical induction furnace in such proportions as to provide a synthetic hot metal containing about 1.78 percent vanadium. This molten metal was covered with a layer of dry pulverized lime in the transfer ladle as insulation during the five minute period required to transfer it from the induction furnace (simulating a smelter in commercial production) to the converter. The hot metal at a temperature of 2785° F. was introduced to the converter in its horizontal loading position in which the tuyeres are disposed above the axis of the converter and the level of molten metal. The laboratory scale converter used in this test had a volume of about 1.9 cubic feet within the magnesium oxide refractory liner, the interior diameter of the vessel being 12 inches and the effective height 29 inches. The charge consisted of about 300 lbs. of hot metal. Dry air was fed through both tubes of the tuyeres from compressed air cylinders at a pressure of 75 psig during the charging operation.

On completion of the charging operation the valves were operated to switch from dry air, to feed methane at 50 psig through the outer tube and oxygen at 100 psig through the inner tube of each tuyere. The converter was righted to vertical flow position as the switch in gases was made. The blowing operation was very quiet with almost complete absence of fume discharge from the open mouth of the converter. Visible vibration did, however, indicate vigorous agitation of the molten metal by the gases and reaction products. The initial blowing operation continued for 3 mins. and 20 sec. before the converter was turned down and the system switched back to air. This period was calculated to provide the theoretical requirement of oxygen to oxidize the vanadium content of the charge. After a sample of the bottom blown metal was taken, the converter was turned up again and further blown with oxygen and methane until a total of twice the theoretical oxygen requirement for the vanadium had been introduced to the melt. The blown metal was then poured into a refractory lined cast iron pot mold from which samples of slag and metal were taken.

The final slag analyzed to contain 15.1 percent vanadium and 29.23 percent iron for a vanadium to iron ratio of 0.52. Such a slag would be superior to the lower vanadium to iron ratio slags of the prior art for use in the refining step of the Rathmann et al. process for producing ferrovanadium alloys. The metal contained 1.22 percent vanadium at the end of the first blow and 1.26 percent in the final product.

EXAMPLE III

Synthetic hot metal was prepared as previously. The methane-oxygen blow was continuous over a 10 minute period including a 30 second converter turn down for sampling midway of the test. The test consumed 225 cubic feet of oxygen and 45.4 cubic feet of methane (20 percent volume/volume based on the oxygen). The pressure of both gas systems was 50 psig.

The slag produced in this test had a V/Fe ratio of 0.59 which upgraded to 0.72 on a resample from which fine metallic iron was more completely removed. Total vanadium and carbon oxidation based on metal analysis was 37 percent and 55 percent respectively. Of particular interest is the fact that virtually no change occurred in the iron content of the slag (25 percent to 25.34 percent) from the mid-point of the blow until the blow was concluded whereas vanadium increased from 4.30 percent to 14.85 percent and most importantly carbon in the metal decreased from 3.34 percent to 1.85 percent (45 percent decrease). Normally a carbon change of this magnitude would have been reflected by increased iron oxidation.

EXAMPLE IV

Using the same general procedure as the previous example, a schedule 15 minute blow was successfully carried to completion resulting in a slag with a V/Fe ratio of 1.25. Methane-oxygen flow was continuous for the full period including two 30 second turn-downs for sampling. The test consumed 400 cubic feet of oxygen and 188 cubic feet of methane. The 47 v/v percent methane delivered was far in excess of the 20 v/v percent tuyere protection level established in Example III. The higher ratio of methane was found to be due to the depletion of the oxygen supply during the long blow. The cooling effect of the higher methane ratio was clearly evident as donut-shaped masses of metal frozen around each tuyere and substantial skulling of metal occurred on the upper walls of the converter. Obviously, the upper practical cooling limit had been exceeded.

Analytical results of 1.42 percent V and 2.58 percent Fe in the 7 minute slag sample (no slag was obtained with the 11 minute sample) suggests that the higher methane level somewhat suppressed both iron and vanadium oxidation, but that overall oxidation continued to be selective for vanadium as reflected by the 0.55 V/Fe ratio. This selectivity of oxidation was confirmed by the 1.25 V/Fe obtained in the final (15 minute) slag sample. Analytical results of the 7, 11, and 15 minute metal samples showed a normal rate of carbon removal as compared with previous tests. It is surprising that with 90 percent removal of carbon (3.98 percent to 0.41 percent), residual vanadium was still 1.44 percent (44 percent oxidation). Even more surprising, however, was the 18.38 percent V (32.81 percent $V_2O_5$) and 14.72 percent Fe (18.94 FeO) in the final slag. Assuming 90 percent vanadium recovery and 100% iron recovery, calculations show that slag of this composition would produce a ferrovanadium alloy by the Rathmann et al. process with nominally 42 percent V and 37 percent Fe. The analyses are tabulated below

|  | Percent | | | Ratio |
|---|---|---|---|---|
|  | V | C | Fe | V/Fe |
| Metal before $O_2$ blow | 2.55 | 3.98 | — | — |
| Metal - 7 minute sample | 2.85 | 2.51 | — | — |
| Slag - 7 minute sample | 0.80 | — | 2.58 | .55 |
| Metal - 11 minute sample | 2.20 | 1.33 | — | — |
| Final Metal (15 min.) | 1.44 | 0.41 | — | — |
| Final Slag (15 min.) | 18.38 | — | 14.72 | 1.25 |

EXAMPLE V

Synthetic hot metal (about 2700° F.) was prepared as previously by combining 281.25 pounds of the pig iron and 18.75 pounds of the ferrovanadium alloy described in Example II. The methane-oxygen blow was continued until 59 pounds of oxygen and 4 pounds of methane had been consumed. The pressure of the oxygen was 44 psig, whereas that of the methane was 18 psig.

Samples of the metal and slag were taken at periodic intervals during the blow and again at the end of the blow. Analysis of the various samples of metal and slag are set forth in the following table.

|  | Percent | | | | |
|---|---|---|---|---|---|
|  | Metal | | Slag | | |
| Sample | V% | C% | V% | Fe% | V/Fe |
| Base | 2.05 | 4.94 | — | — | — |
| 10 Minutes | 1.32 | 1.96 | 10.86 | 18.14 | 0.60 |
| 12 Minutes | 0.84 | 1.10 | 14.82 | 21.13 | 0.70 |
| 14 Minutes | 0.50 | 0.36 | 17.75 | 24.41 | 0.72 |
| 16 Minutes | 0.02 | 0.022 | 19.31 | 19.09 | 1.01 |
| Final | 0.01 | 0.016 | 14.66 | 28.11 | 0.52 |

The foregoing example demonstrates that by means of the process of this invention over 90% of the vanadium in the pig iron is oxidized to produce a slag containing a V/Fe ratio greater than 0.5.

It is apparent from the foregoing actual tests that the submerged blowing of molten vanadium-containing pig iron produces slags containing at least 8 percent vanadium and an iron to vanadium ratio of at least about 0.5 and generally considerably higher. Such vanadium to iron ratios are not obtained in slags produced by the Highveld process. Consequently, the present invention makes possible the direct production of vanadium-bearing slags useful in the refining step of the Rathmann et al. process to produce valuable ferrovanadium alloys for the alloying of iron and steel.

What is claimed is:

1. A process for the production of a slag having a high weight ratio of vanadium to iron which can be used without further refining in production of ferrovanadium alloys containing at least about 40% by weight of vanadium which comprises introducing below the upper surface of a bath of molten pig iron containing from about 0.5 to about 3%, by weight, of vanadium, a highly oxidizing gas at a pressure of from about 40 to about 90 psig, together with a protective fluid at a pressure from about 20 to about 45 psig to increase the life of the means through which said oxidizing gas is introduced to said bath, while maintaining said bath of molten metal at a temperature in the range of about 2600° to 2900° F., continuing the introduction of said oxidizing gas and protective fluid until the carbon content of said pig iron has been reduced to an amount in the range of from about 2 to about 0.02%, whereby the vanadium in said pig iron is oxidized preferentially as compared to iron to obtain a slag containing at least 8%, by weight, of vanadium and in which the weight ratio of vanadium to iron is at least 0.5, and separating the slag from the hot metal.

2. The method according to claim 1 in which the pig iron contains from about 1 to about 2 percent vanadium, said oxidizing gas is oxygen and said protective fluid is methane.

3. The process according to claim 1 in which said bath of molten pig iron is maintained at a temperature in the range of about 2700° to 2800° F. during introduction of said oxidizing gas and protective fluid.

4. The method of claim 1 in which said pig iron is obtained by smelting a synthetic ore comprising a mixture of low-vanadium content magnetite ore and a high-vanadium content raw material.

5. A method according to claim 4 wherein the magnetite ore contains at least about 2 percent titania and about 0.5 percent vanadium, and the high-vanadium content raw material is a vanadium-containing fly ash.

* * * * *